May 11, 1937.  A. H. OELKERS  2,079,658
TRUCK
Filed July 29, 1932  2 Sheets-Sheet 1
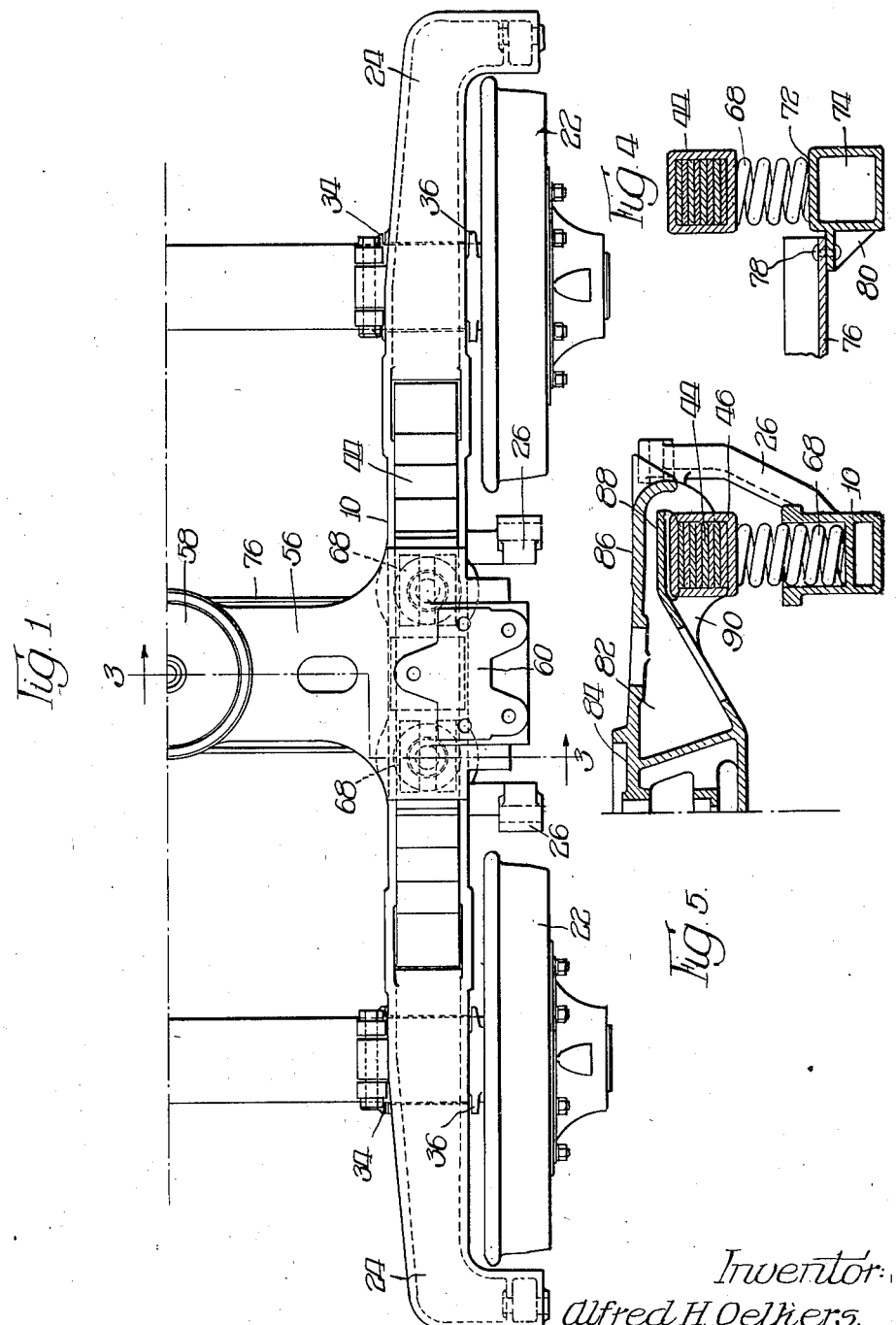
Inventor:
Alfred H. Oelkers,
By Wilkinson, Huxley, Byron & Knight
Attys May 11, 1937.  A. H. OELKERS  2,079,658
TRUCK
Filed July 29, 1932   2 Sheets-Sheet 2
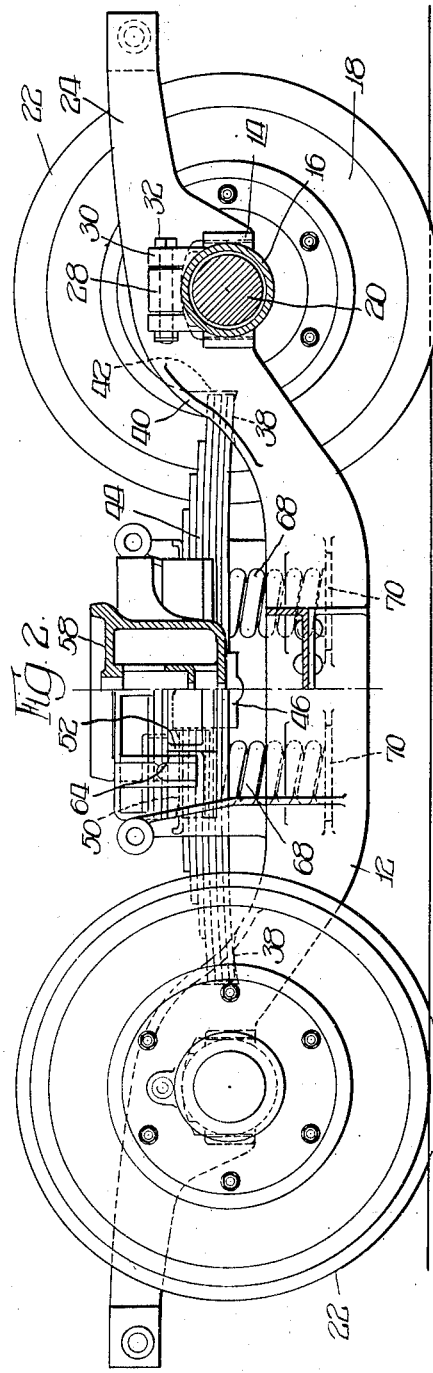
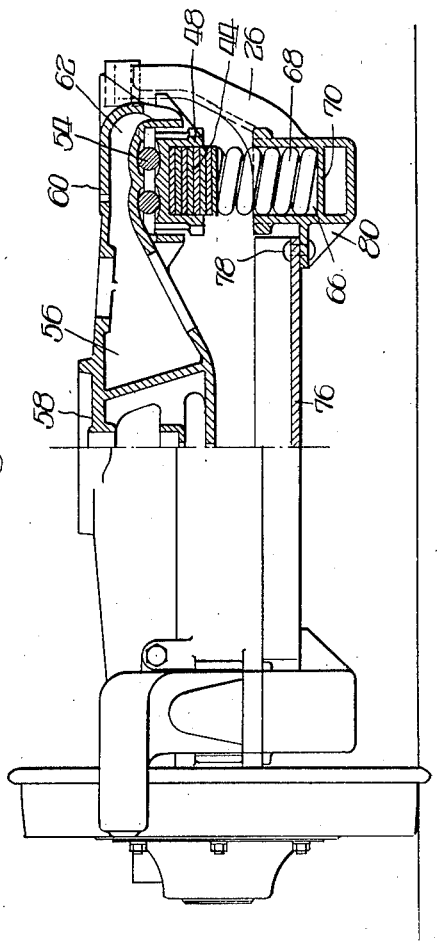
Inventor
Alfred H. Oelkers, Patented May 11, 1937

2,079,658

UNITED STATES PATENT OFFICE 2,079,658

TRUCK

Alfred H. Oelkers, Chicago, Ill., assignor to American Steel Foundries, Chicago, Ill., a corporation of New Jersey Application July 29, 1932, Serial No. 625,733

4 Claims. (Cl. 105—182)

This invention pertains to railway trucks.

It is an object of this invention to provide a lighter, simpler truck for carrying railway cars and for service as lead truck for locomotives and for other uses.

Desirable features for freight car trucks and pilot trucks are economy, simplicity, lightness, strength and ease of maintenance, and these features are generally obtained within practical limitations on freight car trucks and pilot trucks now in use. However, present freight car trucks and pilot trucks are very deficient in easy riding qualities since the spring suspension usually consists only of coil springs which strike a natural period of oscillation or vibration at some operating speed of the car. The resulting motion imparted to truck parts, car body and lading is violent and destructive and results in much damage to lading. Track or wheel irregularities, even if very slight, will set up this oscillation and when the frequency with which these irregularities are passed over agrees with the vibration period of the springs the motion amplifies and continues, due to the lack of dampening qualities in coil springs. The motion may amplify to the extent of causing derailment of the truck.

Efforts have been made to improve this condition by the use of frictional devices with the coil springs for the purpose of dampening the motion, but unless considerable friction is obtained they are not effective enough and if sufficient friction is obtained the spring action becomes too stiff and lacks sensitivity.

Passenger car trucks are generally easy riding, due to the use of both coil and elliptic leaf springs in series, the coil springs responding to the light, quick shocks, the leaf springs to the slow, heavy impulses. Coil springs are quick and sensitive in response, leaf springs relatively less so, partly due to frictional work aborption between the leaves. For this reason, and also by providing coil and leaf springs of different natural vibration periods, they tend to dampen each other's synchronous vibration without impairing free spring response.

It is therefore an object of this invention to provide a truck which provides good riding qualities, and at the same time is economical to make and maintain, is simple and light in construction, and fulfills all requirements of manufacture and service.

Another object is to provide an inboard truck wherein springs of different character are arranged so that each tends to dampen out the vibrations of the other.

Still another object is to provide spring assemblies wherein there is provided softer cushioning action under light loads, while at the same time providing the necessary stiffness and capacity under heavy loads, these features being combined also to provide a structure which reduces any tendency toward synchronous vibration of the springs.

A further object is to provide a truck construction wherein a plurality of resilient members of different character are disposed with relation to each other so that certain of the members are loaded by the other members to increase the amount of energy they will absorb.

A yet further object is to provide a truck construction wherein the load carrying member is supported on the side frame by resilient members of different characteristics and so arranged that certain of the resilient members support a greater portion of the load than other of the resilient members.

A still further object is to provide a truck construction wherein the load carrying member is supported on the side frame by resilient members of different characteristics and so arranged that certain of the resilient members increase certain capacities of other resilient members.

A different object is to provide a side frame construction of great strength, rigidity and simplicity of construction and design wherein provision is made to position spring members and transmit thrusts therefrom to the side frame.

With these and various other objects in view, the invention may consist of certain novel features of construction and operation as will be more fully described and particularly pointed out in the specification, drawings and claims appended hereto.

In the drawings, which illustrate embodiments of the device and wherein like reference characters are used to designate like parts—

Figure 1 is a fragmentary top plan view of a truck construction embodying the invention;

Figure 2 is a fragmentary sectional side elevation of the truck construction shown in Figure 1, the section being taken substantially in the plane of the longitudinal center line of the truck;

Figure 3 is a fragmentary sectional end elevation of the truck construction shown in Figures 1 and 2, the section being taken substantially in the plane as indicated by the line 3—3 of Figure 1;

Figure 4 is a transverse fragmentary sectional elevation taken substantially in the plane of the transverse center line of the truck showing a modified form of truck construction;

Figure 5 is a transverse fragmentary sectional elevation of another modified form of truck construction embodying the invention, the section being taken substantially on the transverse center line of the truck.

Referring first of all more particularly to the truck construction shown in Figures 1, 2, and 3, the truck is of the inboard type, being provided with the side frame 10 substantially of box shape comprising the single beam 12 depressed intermediate the ends thereof and being provided with the pedestal jaws 14 for accommodating pedestal means provided on the outer axle 16 of the wheel and axle assembly 18. The wheel and axle assembly is substantially of the type as shown and described in application Serial No. 554,481, filed August 1, 1931, now U. S. Patent No. 2,043,421 granted June 9, 1936, and includes the outer substantially non-rotatable axle 16, and the inner rotatable axle 20 secured to the wheels 22, anti-friction bearings being provided as described in the above identified application.

The side frame is provided with the end brackets 24 for accommodating the outer brake hangers of clasp brakes, and is also provided with the outwardly extending brake hanger brackets 26 disposed between the wheels and formed integral with the outer web of the side frame for accommodating the inner brake hangers. The side frame is provided with the inwardly extending securing lug 28 disposed adjacent the pedestal jaws 14, said lug being adapted to be embraced by upwardly extending lugs 30 formed on the outer axle 16, securing means such as the bolt 32 passing through aligned apertures in the lugs 28 and 30 for securing the wheel and axle assemblies in operative relation to the side frame. The outer axle is provided with inner and outer thrust lugs 34 and 36 cooperating with suitable bearing surfaces provided on the side frame for accommodating thrust of the wheel and axle assemblies.

Substantially arcuate spring pockets 38 are formed adjacent the pedestal jaws, and flanges 40 are provided on the side frame together with the end thrust wall 42 forming a pocket for receiving the ends of the semi-elliptic leaf spring assemblies 44. The semi-elliptic leaf spring assemblies are provided with interlocking means and are retained by the spring band 46 disposed adjacent the transverse center line of the truck. Suitable load carrying means such as a transom or a bolster is adapted to be supported on the leaf spring 44. In the construction shown in Figures 1, 2, and 3, the leaf spring on each side of the spring band is provided with the roller seat 48 supported on the spring band at spaced points at the seats 50, the roller seat embracing the leaf spring and being privided adjacent the center thereof with the spaced column guides 52. The seat 48 is adapted to accommodate the lateral motion rollers 54, the track of the rollers on the seat and on the bolsters 56 being arranged so that the bolster is self-centering.

The bolster is provided with the center and side bearings 58 and 60, and the yoke 62 embraces the seat 48, forming stops to limit the lateral motion of said bolster, the yoke being also provided with column guide cooperating portions 64 cooperating with the column guides 52. The side frames in the construction shown in Figures 1, 2, and 3 are provided with coil spring pockets 66 for accommodating the coil springs 68 disposed between the seat 70, provided intermediate the side webs of the side frame adjacent the pockets and the leaf spring 44, the coil springs being disposed in vertical alignment with the seats 50 whereby the leaves of the spring 44 are pinched together to increase the frictional absorption thereof. With this arrangement the car body may be carried lower than would otherwise obtain.

However, in the construction illustrated in Figure 4, the coil spring 68 may be directly supported on the seat 72 provided on the substantially box shaped side frame 74. Where the lateral motion construction is used, the side frames are tied together by means of the tie member 76 secured as at 78 to suitable brackets 80 provided in the inner web of the side frame.

In the construction shown in Figure 5, the inboard side frame 10 is provided with the brake hanger brackets 26 and the spring pockets for accommodating the coil spring 68. The coil spring has direct cooperative relation with the leaf spring 44, said spring being provided with the spring band 46. In this construction, however, the bolster 82 is provided with the center and side bearings 84 and 86, and is of a construction substantially as shown in application Serial No. 593,954, filed February 19, 1932, now U. S. Patent No. 2,051,649 granted August 18, 1936, wherein the bolster is provided with the yoke 88 embracing the leaf spring 44, being provided with the stops 90 engaging on each side of the spring band 44 for preventing relative movement between the bolster and leaf longitudinally of the leaf spring. The bolster is provided with spaced seats adapted to engage the top of the leaf spring assembly substantially in vertical alignment with the coil springs 68 whereby the frictional absorption of the leaf spring is increased through compression of the leaves thereof.

It is to be understood that I do not wish to be limited by the exact embodiments of the device shown, which are merely by way of illustration and not limitation, as various and other forms of the device will of course be apparent to those skilled in the art without departing from the spirit of the invention or the scope of the claims.

I claim:

1. In an inboard truck, the combination of spaced wheel and axle assemblies, a side frame extending therebetween and comprising a rigid member having seats adjacent said assemblies, a spring extending between and supported on said seats, a load carrying member supported by said spring and having a yoke provided with inner and outer jaws embracing said spring, said load carrying member having a side bearing disposed above said yoke and extending outwardly beyond said spring, said outwardly extending portion of said side bearing being reinforced by said outer jaw.

2. In an inboard truck, the combination of spaced wheel and axle assemblies, a side frame extending therebetween and comprising a rigid member having seats adjacent said assemblies, a spring extending between and supported on said seats, a seat member embracing said spring and having column guides, a load carrying member provided with a yoke embracing said spring and seat member and having spaced outer jaws cooperating with said column guides, means providing seating relation of said load carrying member on said seat member, said load carrying member having a side bearing disposed above said yoke and extending outwardly beyond said spring, said outwardly extending portion of said side bearing being reinforced by said outer jaws.

3. In an inboard truck, the combination of spaced wheel and axle assemblies, a side frame extending therebetween and comprising a rigid member having seats adjacent said assemblies, a spring extending between and supported on said seats, said spring having a spring band, a seat member embracing said spring and spring band and having column guides, a load carrying member provided with a yoke embracing said spring and seat member and having spaced outer jaws cooperating with said column guides, means providing seating relation of said load carrying member on said seat member, said load carrying member having a side bearing disposed above said yoke and extending outwardly beyond said spring, said outwardly extending portion of said side bearing being reinforced by said outer jaws.

4. In an inboard truck, the combination of spaced wheel and axle assemblies, a side frame extending therebetween and comprising a rigid member having seats adjacent said assemblies, a spring extending between and supported on said seats, said spring having a spring band, a load carrying member supported by said spring and having a yoke provided with inner and outer jaws embracing said spring, said inner jaws engaging on each side of said spring band to prevent relative movement of said load carrying member with respect to said spring, said load carrying member having a side bearing disposed above said yoke and extending outwardly beyond said spring, said outwardly extending portion of said side bearing being reinforced by said outer jaw.

ALFRED H. OELKERS.